(12) United States Patent
Schedivy

(10) Patent No.: US 7,050,124 B2
(45) Date of Patent: May 23, 2006

(54) MOBILE VIDEO SYSTEM

(75) Inventor: George C. Schedivy, Aquebogue, NY (US)

(73) Assignee: Samsung Electronics Co., Ltd. (KR)

( * ) Notice: Subject to any disclaimer, the term of this patent is extended or adjusted under 35 U.S.C. 154(b) by 33 days.

(21) Appl. No.: 10/658,313

(22) Filed: Sep. 9, 2003

(65) Prior Publication Data

US 2004/0085485 A1 May 6, 2004

Related U.S. Application Data

(60) Provisional application No. 60/423,882, filed on Nov. 5, 2002.

(51) Int. Cl.
*H04N 5/64* (2006.01)

(52) U.S. Cl. .................................... 348/838; 348/837

(58) Field of Classification Search .............. 348/837, 348/838, 836, 739; 312/7.2; 248/917–919, 248/922, 923; 296/35.3; H04N 5/64
See application file for complete search history.

(56) References Cited

U.S. PATENT DOCUMENTS

| | | | |
|---|---|---|---|
| D275,819 S | 10/1984 | Leiserson | D3/33 |
| 4,635,110 A | 1/1987 | Weinblatt | 358/93 |
| 4,658,298 A | 4/1987 | Takeda et al. | 358/254 |
| 5,016,849 A * | 5/1991 | Wu | 248/176.3 |
| 5,044,321 A | 9/1991 | Selph | 119/96 |
| 5,168,423 A * | 12/1992 | Ohgami et al. | 361/681 |
| 5,326,175 A | 7/1994 | Carter | 383/22 |
| 5,555,466 A | 9/1996 | Scribner et al. | 348/8 |
| 5,868,294 A | 2/1999 | Webster | 224/275 |
| 6,092,705 A | 7/2000 | Meritt | 224/275 |
| 6,097,448 A | 8/2000 | Perkins | 348/837 |
| 6,131,130 A * | 10/2000 | Van Ryzin | 710/6 |
| 6,216,927 B1* | 4/2001 | Meritt | 296/37.15 |
| 6,272,104 B1* | 8/2001 | Liao et al. | 720/709 |
| 6,380,978 B1 | 4/2002 | Adams et al. | 348/452 |
| 6,393,745 B1 | 5/2002 | Miki | 40/586 |
| D458,254 S | 6/2002 | Goto | D14/371 |
| 6,409,242 B1* | 6/2002 | Chang | 312/7.2 |
| 6,473,315 B1 | 10/2002 | Denmeade | 361/831 |
| 6,522,368 B1 | 2/2003 | Tuccinardi et al. | 348/837 |
| 6,685,016 B1* | 2/2004 | Swaim et al. | 206/320 |
| 6,871,356 B1* | 3/2005 | Hashimoto | 348/837 |
| 2001/0011664 A1 | 8/2001 | Meritt | 224/275 |
| 2002/0105507 A1* | 8/2002 | Tranchina et al. | 345/204 |
| 2003/0057339 A1 | 3/2003 | Watkins | 248/274.1 |
| 2003/0102235 A1 | 6/2003 | Swaim et al. | 206/320 |

* cited by examiner

*Primary Examiner*—Sherrie Hsia
(74) *Attorney, Agent, or Firm*—F. Chau & Associates LLC

(57) ABSTRACT

A video system comprises at least one media player, at least one display, wherein the at least one display is capable of receiving a first video signal and a first audio signal corresponding to a first program from the at least one media player, an assembly housing for supporting the at least one media player and the at least one display, and a wireless transmitter on the at least one display for wirelessly transmitting at least one of the first video signal and the first audio signal.

53 Claims, 15 Drawing Sheets

MOBILE VIDEO SYSTEM

REFERENCES TO RELATED APPLICATIONS

This application claims the benefit of Provisional Application Ser. No. 60/423,882, filed on Nov. 5, 2002, the contents of which are herein incorporated by reference.

BACKGROUND OF THE INVENTION

1. Field of the Invention

The present invention relates to a mobile video system, and more particularly to a mobile video system capable of being transferred between different vehicles and settings and of wireless transmission of video and audio signals.

2. Discussion of Related Art

As society becomes more mobile and therefore spends a greater amount of time traveling and away from home, demand rises for electronic appliances and devices outside the home environment. For example, video display devices, video cassette players (VCPs) and digital video disk (DVD) players have been provided in vehicles for video entertainment while traveling.

However, many known video systems cannot be removed from the vehicle, transferred to another vehicle or operated outside the vehicle setting. Thus, videos may only be viewed with such systems when occupying a specific vehicle. There is also a risk of theft of the video screen and video player and corresponding damage to the vehicle when a vehicle having a video system therein is left unattended.

Another problem is that many known video systems have been limited to a single display, thereby limiting the entertainment to one video program at a given time and making it difficult for all vehicle occupants to view the display.

Accordingly, a need exists for a video system that is easily transferable between vehicles and other settings and is capable of operating with more than one display and/or media player for the convenience of all vehicle occupants.

SUMMARY OF THE INVENTION

A video system, according to an embodiment of the present invention, includes at least one media player at least one display, wherein the at least one display is capable of receiving one of a first video signal and a first audio signal corresponding to a first program from the at least one media player, an assembly housing for supporting the at least one media player and the at least one display, and a wireless transmitter on the at least one display for wirelessly transmitting at least one of the first video signal and the first audio signal.

The wireless transmitter may wirelessly transmit the first audio signal to at least one pair of wireless headphones and wirelessly transmit at least one of the first video signal and the first audio signal to at least one other display. The at least one display may receive a second video signal and a second audio signal corresponding to a second program from one of the at least one media player and at least one other media player, and the wireless transmitter may wirelessly transmit at least one of the second video signal and the second audio signal on a different channel and at a different frequency from the first video signal and the first audio signal.

The wireless transmitter can simultaneously transmit the first and second video signals and the first and second audio signals and may be capable of simultaneously transmitting each of a plurality of wireless signals on a different channel and at a different frequency. The wireless transmitter may be capable of wirelessly transmitting signals using at least one of infrared and radio frequency. The video system may further include at least one other wireless transmitter on one of the at least one media player and the assembly housing and capable of transmitting at least one of the first video signal and the first audio signal to wireless headphones, the at least one display and at least one other display.

The at least one display may include a multiplexer for selecting one of the first and second programs for display and the at least one display may be operatively coupled to the at least one media player and may be capable of receiving the first video signal and the first audio signal via one of a physical connection and a wireless receiver.

The at least one media player may be one of a videocassette player, a digital video disk player, a television tuner and a video game player, and may be one of a clamshell type, slot type and a drawer type digital video disk player. The at least one media player may include a door that pivots for allowing insertion of a media storage medium into the at least one media player.

The video system further includes a bag for mounting the assembly housing, including the at least one media player and the at least one display, on one seat or between two seats in a vehicle. The bag may include at least one opening or a plurality of openings for providing access to controls, at least one interface panel, and to a media storage medium insertion point of the at least one media player without removing the assembly housing from the bag. The video system may also include a bag for mounting the at least one display to a seat in a vehicle when the at least one display is remote from the assembly housing, wherein the bag includes at least one opening for providing access to an interface panel and/or for providing a view of a screen of the at least one display without removing the at least one display from the bag.

The at least one display may be mounted to the assembly housing in first and second positions corresponding to respective first and second orientations of the assembly housing. The at least one display may also be pivoted on the assembly housing to a plurality of positions.

Another video system, in accordance with the present invention, includes at least one media player, at least one display, wherein the at least one display is capable of receiving one of a first video signal and a first audio signal corresponding to a first program from the at least one media player, an assembly housing for supporting the at least one media player and the at least one display, and a first bag for mounting the assembly housing on one seat or between two seats in a vehicle, wherein the first bag includes a plurality of openings for providing access to controls, at least one interface panel, and a media storage medium loading point of the at least one media player without removing the assembly housing from the first bag.

The at least one interface panel may include input ports and output ports. The video system may include a second bag for mounting the at least one display to a seat in a vehicle when the at least one display is remote from the assembly housing, wherein the second bag includes at least one opening for providing access to at least one interface panel and/or for providing a view of a screen of the at least one display without removing the at least one display from the bag. The second bag may be mounted to a rear of the vehicle seat using at least one strap wrapped around the vehicle seat. The video system may also include a wireless transmitter on the at least one display capable of wirelessly transmitting at least one of the first video signal and the first audio signal.

Another video system, in accordance with the present invention, includes a first media player and a second media player, at least one display operatively coupled to the first and second media players, an assembly housing for supporting the first and second media players and the at least one display, and a bag for mounting the assembly housing on one seat or between two seats in a vehicle.

The first and second media players may be one of a videocassette player, a digital video disk player, a television tuner and a video game player. The first media player may play media having a different video format then media played by the second media player. For example, the first media player may be a videocassette player and the second media player may be a digitial video disk player. The at least one display may be capable of receiving video signals and audio signals from the first media player and the second media player. The first and second media players may be capable of wired and wireless transmission of at least one of video and audio signals.

The at least one display may receive the video and audio signals via one of a wired connection and wireless connection and may include jacks for connecting to the first and second media players, at least one other display and headphones. The assembly housing may also include jacks for connecting the first and second media players to the at least one display, at least one other display and headphones. The at least one display may be capable of displaying a program from one of the first and second media players while the at least one display is one of supported by and remote from the assembly housing. At least one other display may be capable of receiving video signals and audio signals from one of the first media player and the second media player. The bag for mounting the assembly housing on one seat or between two seats may include a plurality of openings for providing access to controls, to at least one interface panel, and to media storage medium loading points of the first and second media players without removing the assembly housing from the bag.

BRIEF DESCRIPTION OF THE DRAWINGS

Preferred embodiments of the invention can be understood in more detail from the following descriptions taken in conjunction with the accompanying drawings in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
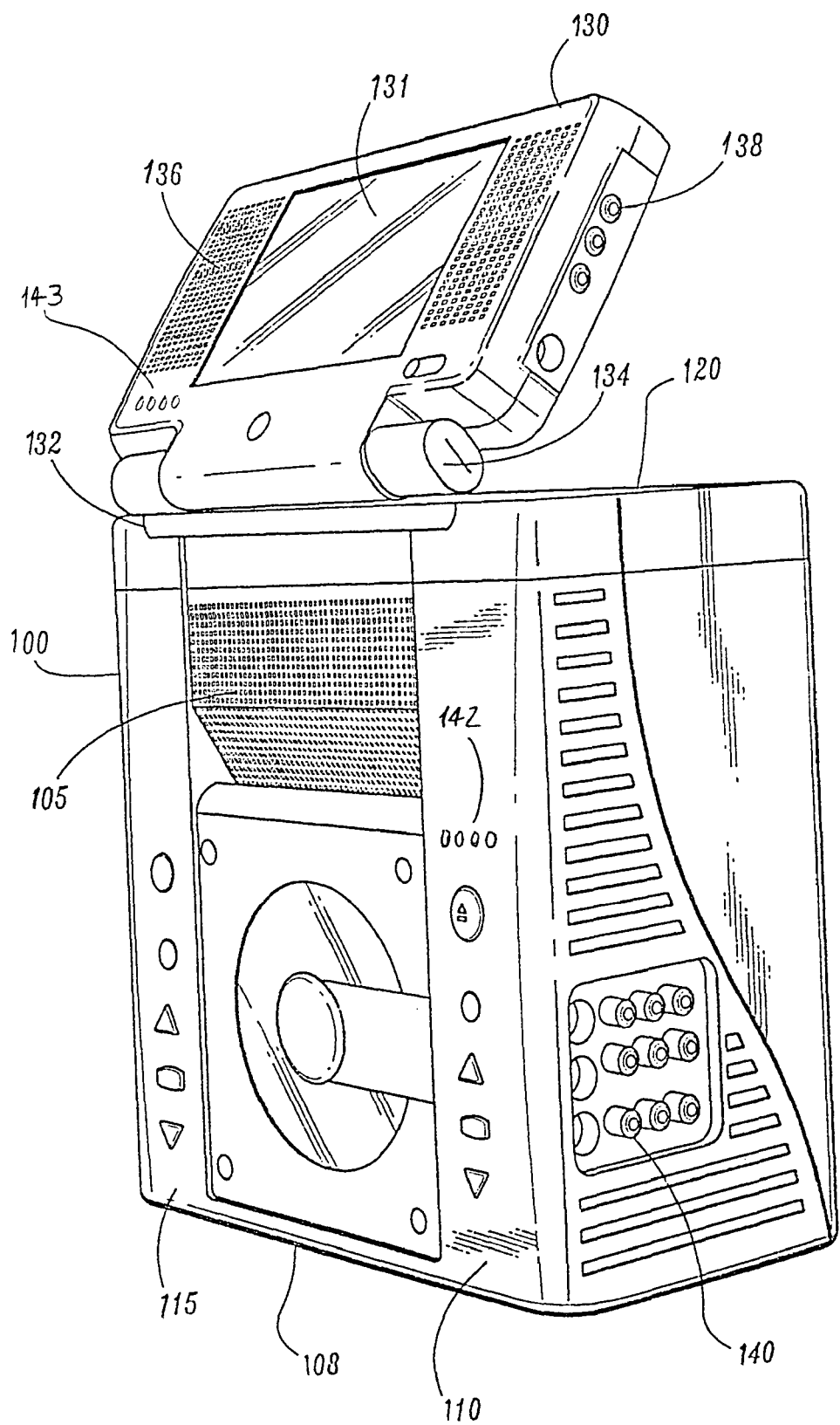
FIG. 1 shows a video player housing and display according to an embodiment of the present invention.

Referring to FIG. 1, a video player housing 100 includes a first media or video player 108 and a second video player 120 and display 130. Positioned along one side of a front panel of the video player housing 100 are control buttons 110 which can be used to control play of the first video player 108. Control buttons 115 positioned along a second side of the video player can be used for controlling play or play characteristics of a second video player 120. The audio portion of the video programs can be played over speaker 105. Along a side of the video player housing 100 is an interface panel 140 having connectors for connecting to headphones, additional displays, or other accessories. Display 130 comprises a screen 131 for displaying a video program. The screen 131 may have a diagonal length of 4 to 8 inches, and is preferably a 5.8 or a 7-inch LCD type display. The display 130 can be attached to the video player housing 100 via connector 132. The connector preferably includes electrical connectors for connecting to an internal bus of the video player housing 100 for communication of the video, audio or control signals between the first and second video players 108, 120 and the display 130. A hinge arrangement 134 couples the display 130 to the video player housing 100. The hinge arrangement 134 provides the capability of swiveling the display 130, from a point contacting or nearly contacting the top of the video player housing 100 to a point contacting or nearly contacting the front of the video player housing 100. In the latter position, the screen 131 is in a protected position. The display 130 can also be swiveled to a best angle for viewing depending on the orientation of the video player housing 100 during use. The display 130 includes connectors 138 disposed on one or both sides thereof for connecting to headphones or to the video player housing 100 when the display 130 is detached from the video player housing 100.

Speakers 136 can also be used to play the audio portion of a video program. With the display 130 mounted to the video player housing 100 through connector 132, the audio and video information is transmitted from the first and second video players 108, 120 to the display 130 through the connector 132.

Figure 2:
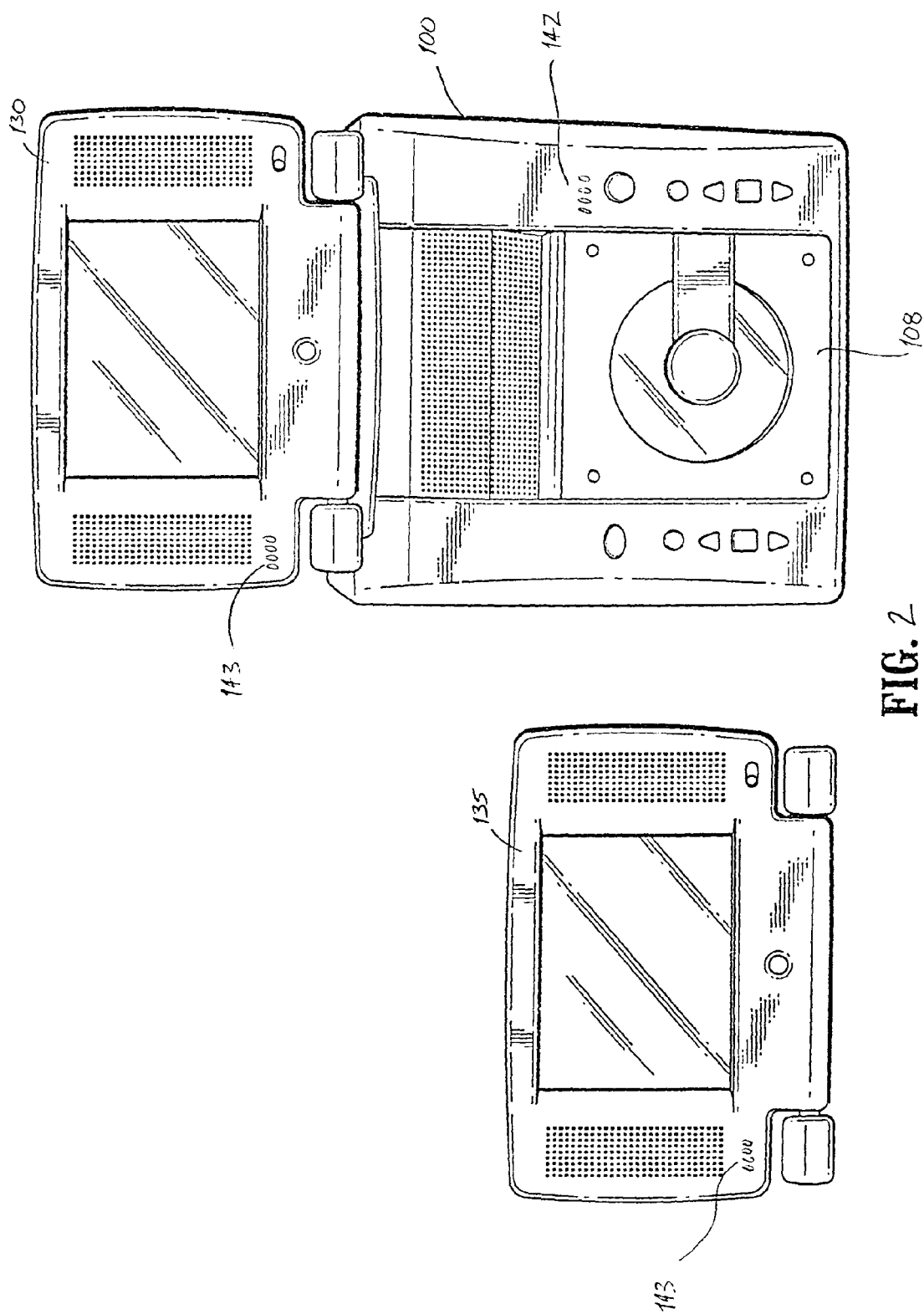
FIG. 2 shows the video player housing of FIG. 1 and a second display.

FIG. 2 shows the video player housing 100 in its upright position with one display 130 attached and a second display 135 detached from the video player housing 100. The second display 135 can be connected to the video player housing 100 through connectors 138 and 140. According to a preferred embodiment of the invention, the first video player 108 is a DVD player and the second video player 120 is a video cassette player (VCP). The first and second video players may, for example, be any combination of a TV tuner, a VCP, a DVD player and a video game player.

Figure 3A:
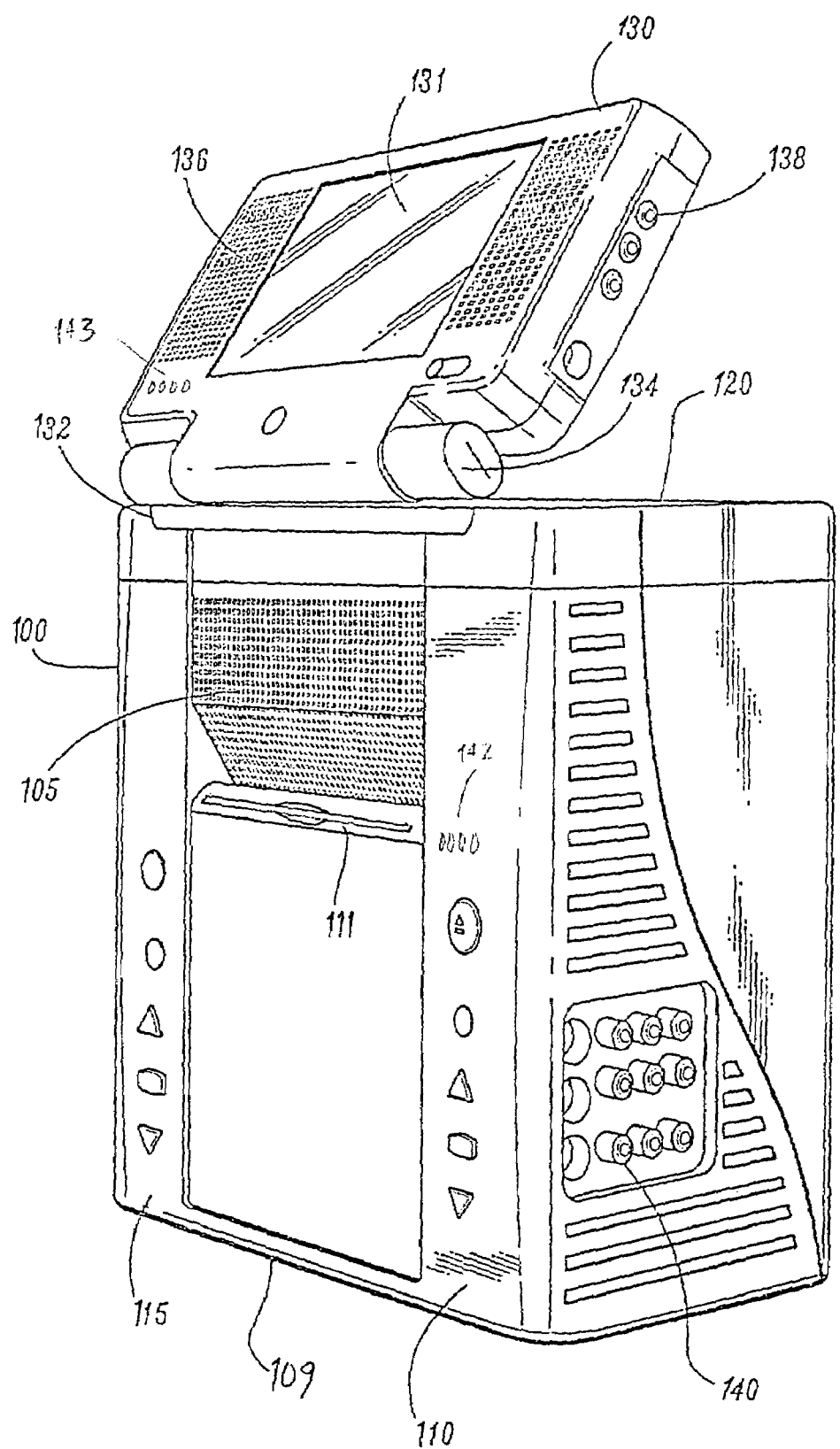
FIGS. 3A–3B show a slot-type DVD player according to an embodiment of the present invention.
Figure 3B:
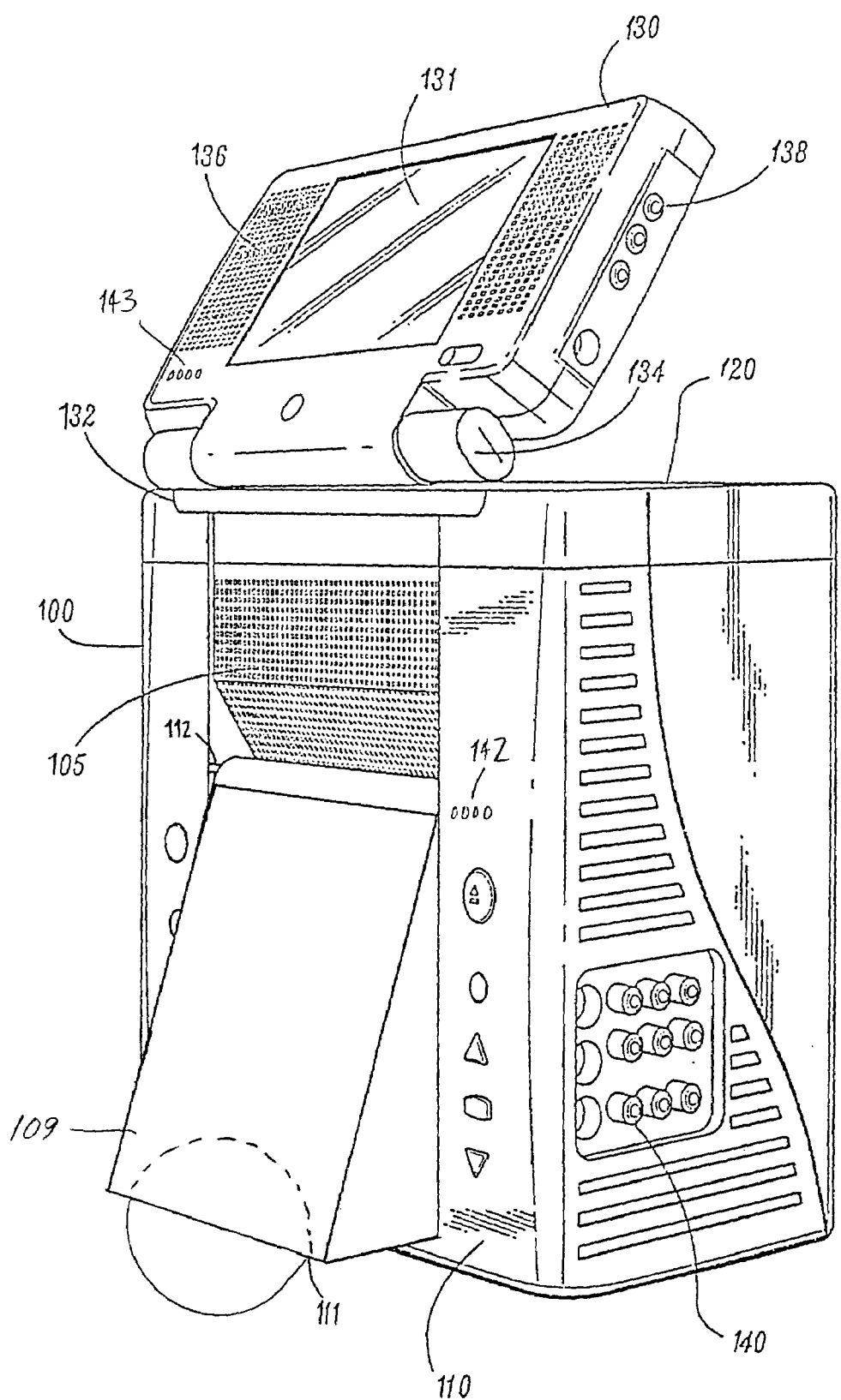

As shown in FIGS. 1 and 2, a "clamshell-type" DVD player 108 is used, wherein a media storage medium, such as a DVD, is inserted into the DVD player 108 from the topside thereof. However, as shown in FIG. 3A, a "slot-type" DVD player 109 may be used, wherein a media storage medium is inserted into the DVD player 109 through a slot 111 positioned on a side of the DVD player 109. As shown in FIG. 3B, the slot 111 may be located on a side of the DVD player 109 that is exposed by pivoting the DVD player 109 on a hinge 112 away from the video player housing 100 or, as shown in FIG. 3A, on a side that remains exposed without having the pivot the DVD player 109.

Figure 4:
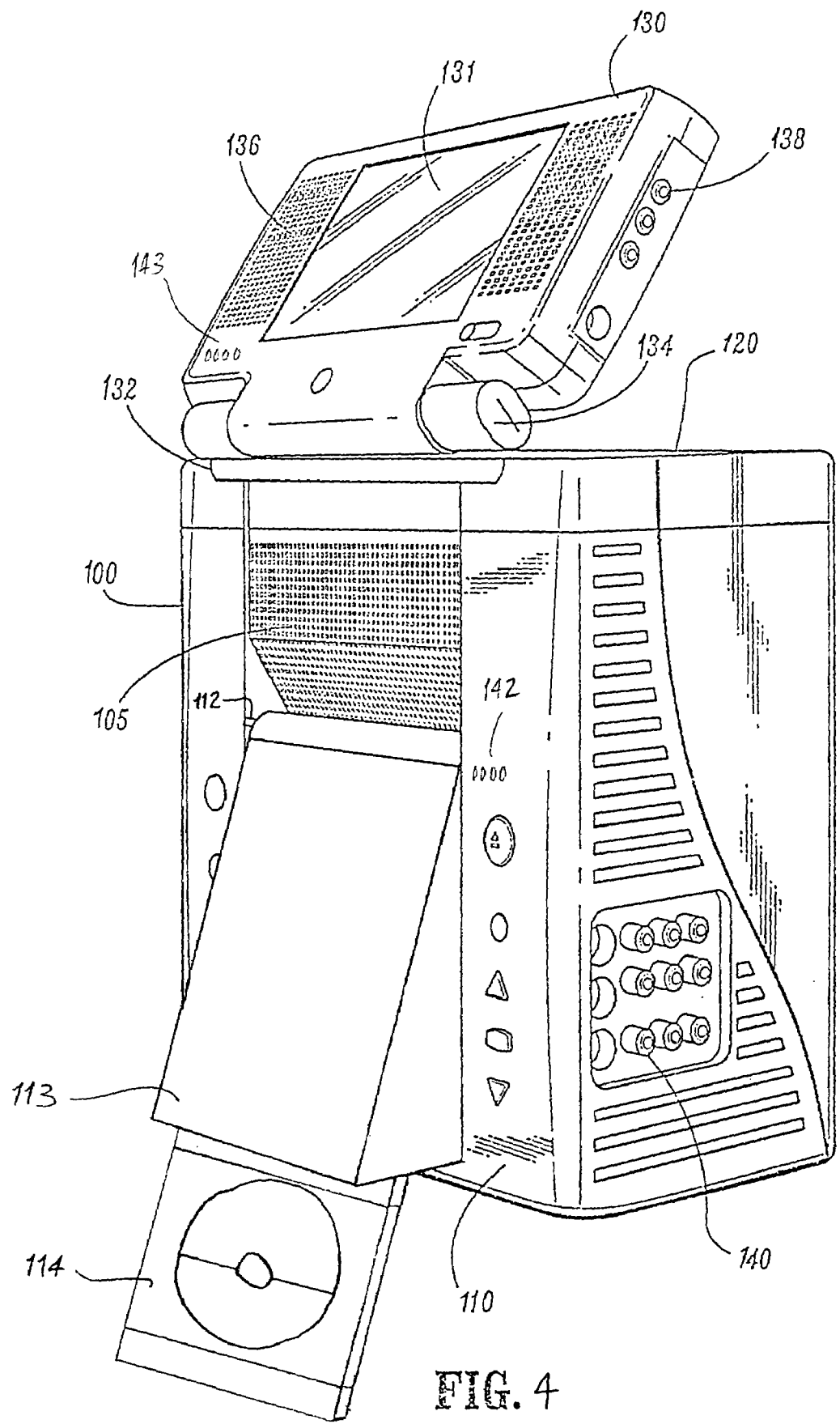
FIG. 4 shows a drawer type DVD player according to an embodiment of the present invention.

As shown in FIG. 4, a "drawer-type" DVD player 113 including a drawer 114 for securing a media storage medium. Like the slot 111, the drawer may be located on exposed and unexposed sides of the DVD player 113. Once the storage medium is inserted onto the drawer 114, the drawer 114 may be slid back into the DVD player 113.

Referring back to FIGS. 1 and 2, both first (DVD) and second (VCP) video players 108, 120 can simultaneously play separate video programs and each video program can be directed to a separate display. Headphones can be connected to one or both displays for audio play of the separate programs. In such a way, the audio from one program does not interfere with the other.

To provide for audio reception through wireless headphones, the video player housing 100, displays 130, 135 and/or the first and second video players 108, 120 may include wireless transmitters 142, 143 for transmitting wireless signals to wireless receivers in wireless headphones. The wireless signals may include radio frequency signals for use with, for example, Bluetooth® wireless systems or infrared (IR) signals for use with, for example, Whitefire® systems. It is preferred that the wireless transmitters 142, 143 have the capability to transmit wireless signals over more than one channel operating at a different frequency for each channel. The use of more than one channel, for example, avoids interference between more than one wireless headphone user watching different programs on different displays. Wireless signals also may be encoded to prevent interference between wireless headphones. Such encoding may be based on, for example, spread spectrum technology.

In addition, video and/or audio signals may be provided to a display through the wireless transmitters 142, 143 located on the video player or on another display. As an alternative to physical connections between displays and the video player, the transmission of wireless video and/or audio signals from the wireless transmitters 142, 143 to the displays allows movement of the displays to any location within a vehicle. Like the wireless headphones, the displays can be equipped with wireless receivers for receiving the wireless signals. The wireless transmitters 142, 143 can be directly or indirectly coupled to the video players 108, 120 for receiving video and/or audio signals for transmission.

The video and/or audio signals can be IR or RF signals and transmitted over more than one channel at different frequencies to avoid interference and enable different programs to be simultaneously played on different displays. As shown, for example, in FIG. 7, each display can include a multiplexer 133 for selecting programs to display.

Figure 5:
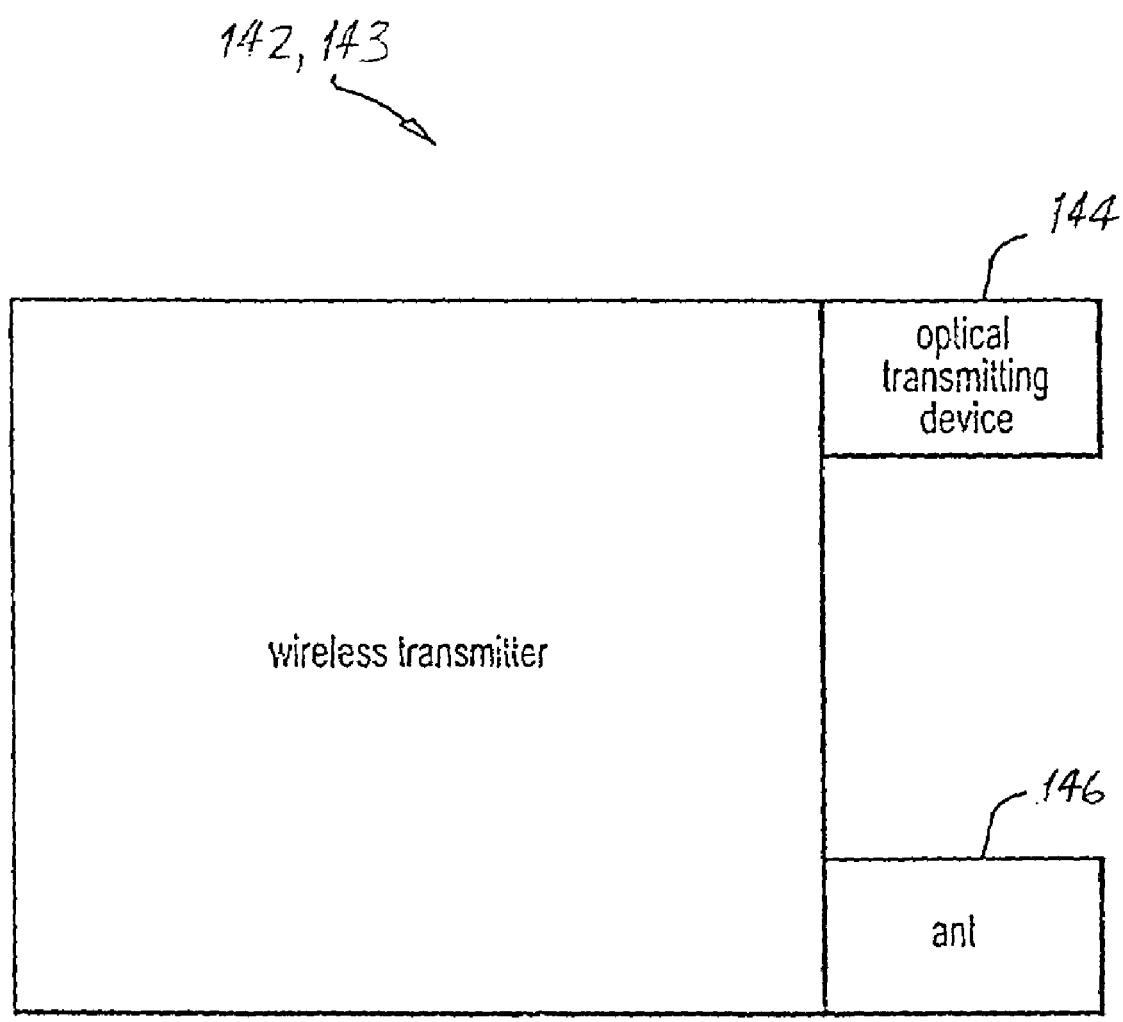
FIG. 5 shows a wireless transmitter according to an embodiment of the present invention.

As shown in FIG. 5, the wireless transmitters 142, 143 each include an optical transmitting device 144 (e.g., an LED, a laser, and so forth) and an antenna 146. The optical transmitting device 144 and the antenna 146 may be used for wireless transmission of IR signals and RF signals, respectively.

Figure 6:
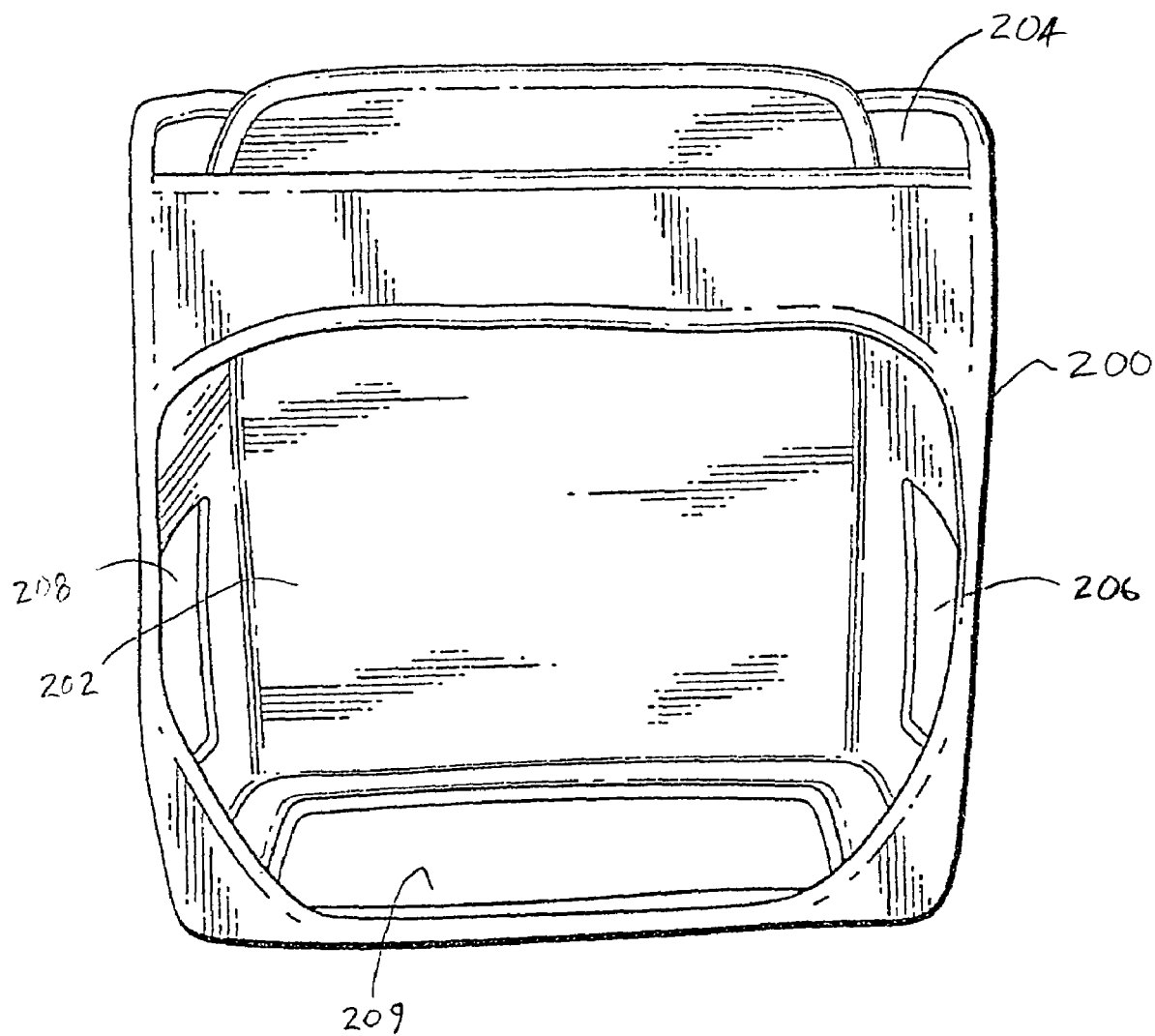
FIG. 6 shows a bag in which the video player housing of FIG. 1 can be placed.

FIG. 6 shows a video bag 200 for holding the video player housing 100. The video bag 200 is preferably made from a flexible but sturdy material such as canvas and is configured to have openings 202, 204 to allow access to the first and second video players 108, 120, respectively. The video bag 200 also includes openings 206, 208, 209 for providing access to interface panels and connectors on the video player housing 100. The video bag 200 may include more or less openings depending on the configuration of the video player housing 100 and the location of the controls, panels and connectors. The video bag 200 further includes a mechanism for facilitating mounting or suspending the video player in an interior of a vehicle. This feature will be further described below with reference to FIG. 11.

Figure 7:
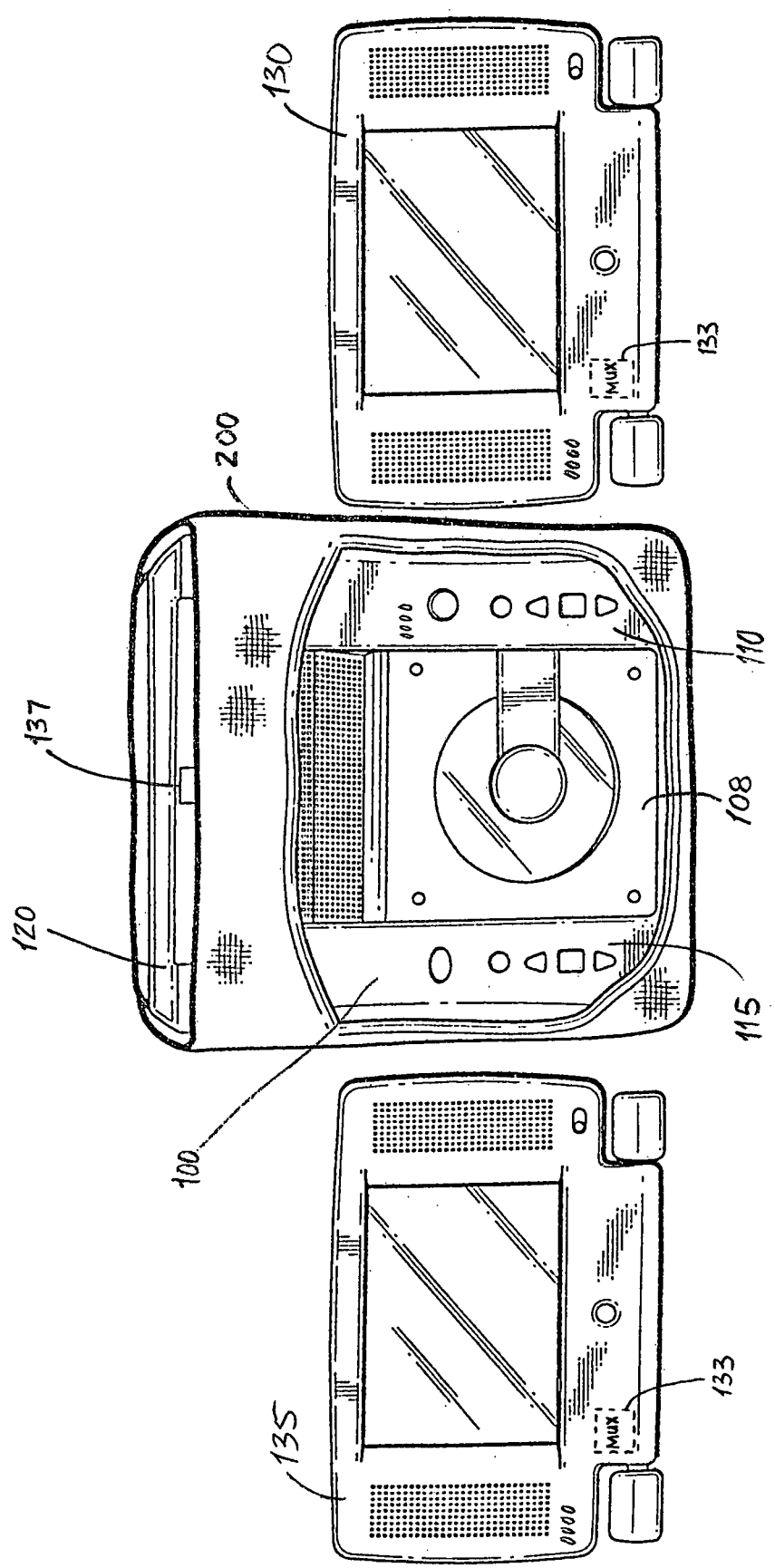
FIG. 7 shows the video player housing of FIG. 1 placed within the bag and two displays detached from the video player housing.

FIG. 7 shows the video player housing 100 placed within the video bag 200 with the displays 130, 135 detached. As shown, both the first (DVD) video player 108 and the second (VCP) player 120 and the controls 110, 115 are accessible when the video player housing 100 is placed in the video bag 200.

Figure 8:
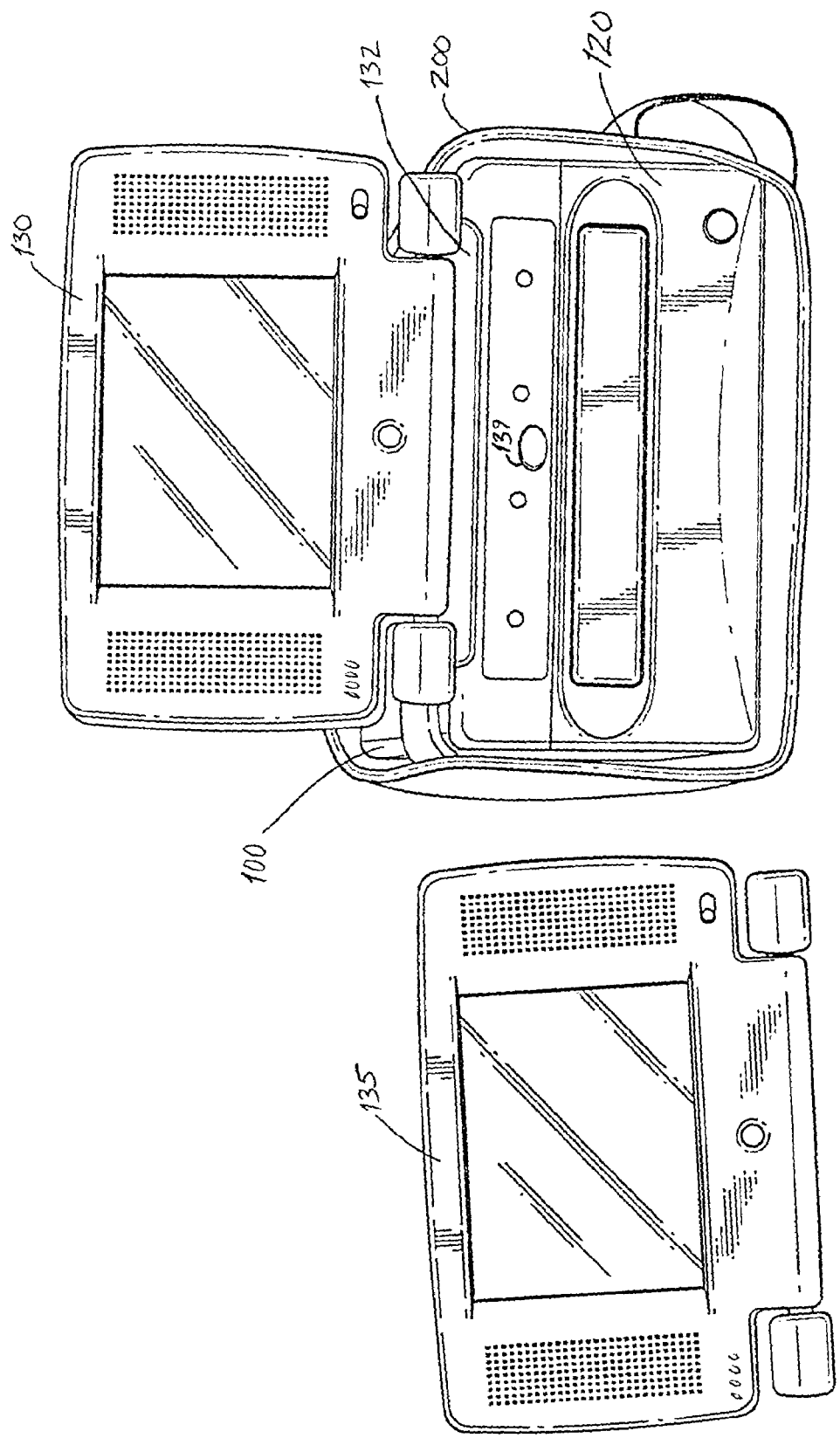
FIG. 8 shows the video player housing of FIG. 1 with the display positioned in the bag and positioned to show the top of the video player housing along with a detached second display.

FIG. 8 shows a top portion of the video player housing 100 with an attached display 130 positioned in the video bag 200. In this orientation, the housing 100 is placed against a surface such as a desktop and the display 130 is reversed from the position shown in FIG. 1. To view a video program, a videocassette can be inserted and played by the VCP 120 in a horizontal position.

Figure 9:
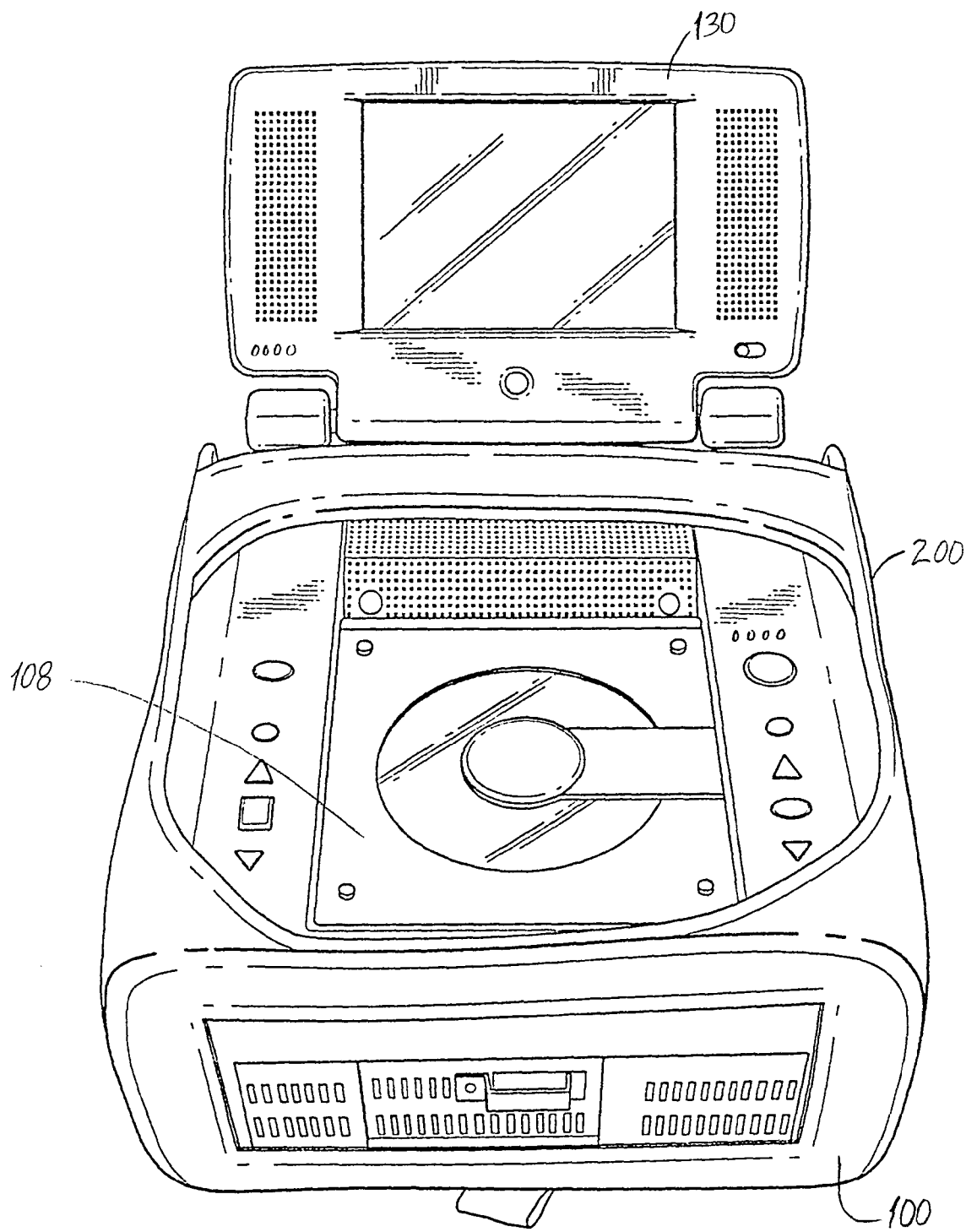
FIG. 9 shows a bottom portion of the video player housing of FIG. 1 in the bag.
Figure 10:
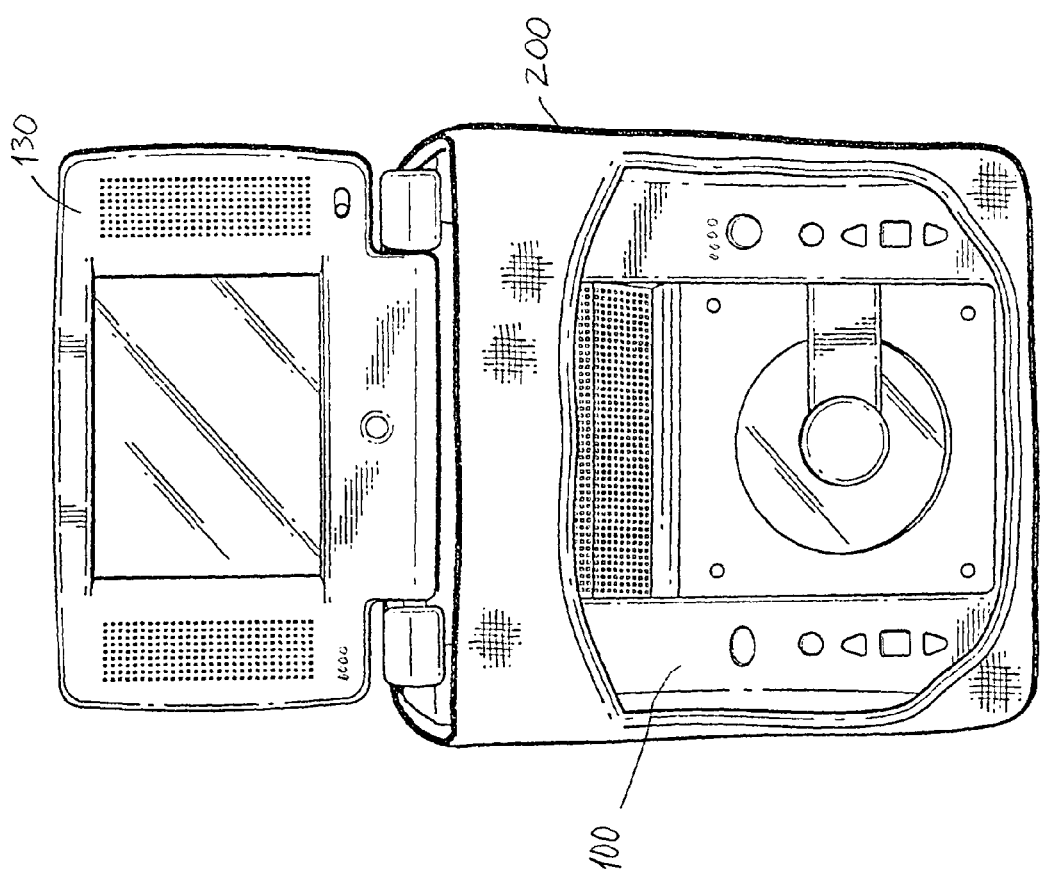
FIG. 10 shows the video player housing of FIG. 1 and display in the bag in an upright position.

FIG. 9 shows another orientation of the video player housing 100 and the display 130. In this orientation, the housing again lays horizontally, such as on a tabletop, and the display 130 is attached in a position reversed from the position as shown in FIG. 8 (i.e., in the same position as shown in FIG. 1). A latch 137 (see FIG. 7) positioned on a top center front portion of the video player housing 100 latches to connector 132. A press button 139 (FIG. 8) is depressed to release the latch 137 and the display 130 from the video player housing 100. FIG. 10 shows the video player housing 100 in the video bag 200 and in an upright position with the attached display 130.

Figure 11:
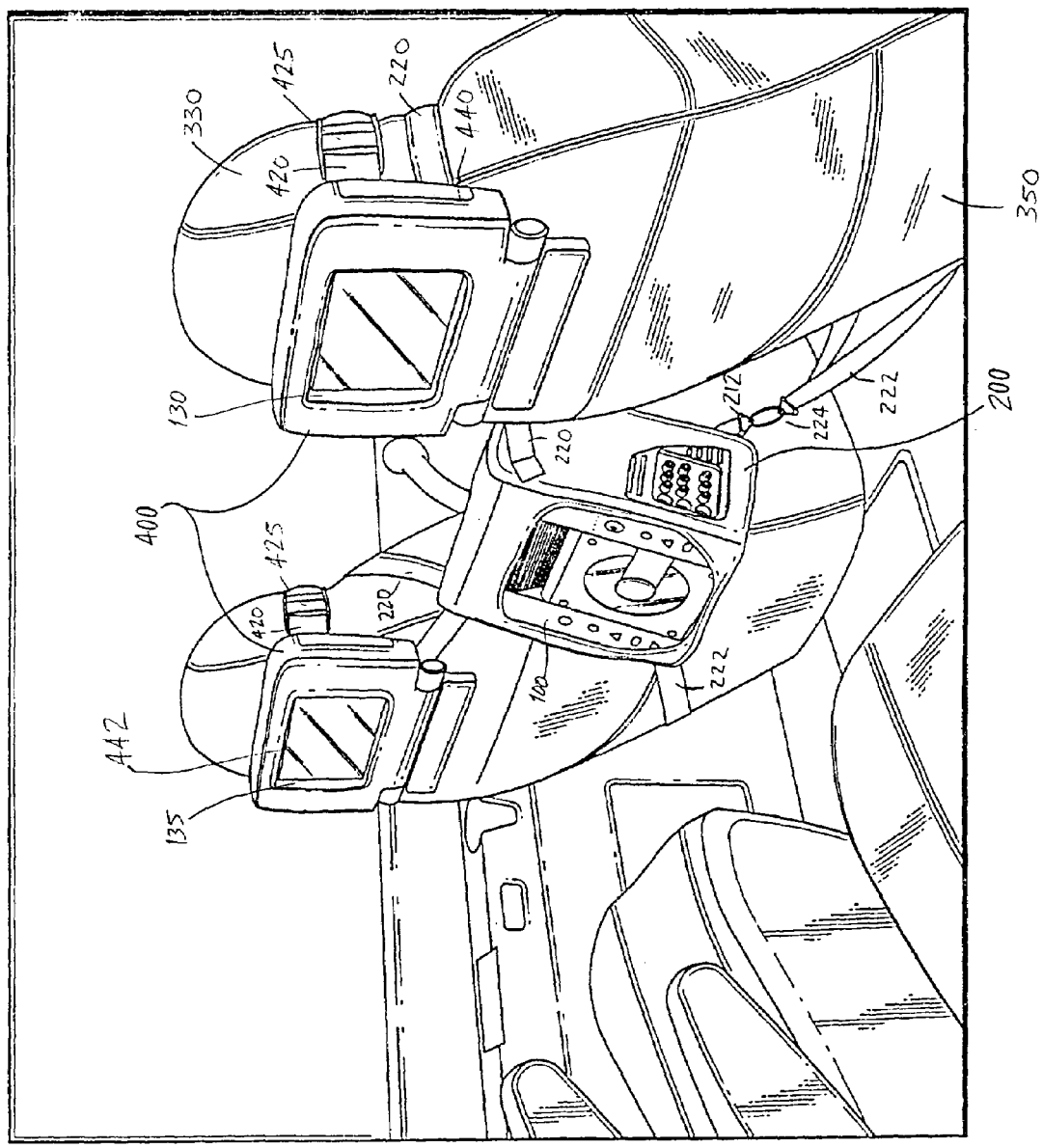
FIG. 11 shows a mobile video system mounted in an interior of a vehicle according to an embodiment of the present invention.

FIG. 11 shows a mobile video system according to a preferred embodiment of the present invention. As shown, the video player housing 100 is placed within a video bag 200. The video bag 200 includes rings at a top (not shown) and rings at a bottom portion (e.g., ring 212) of the bag 200 on left and right sides thereof to facilitate mounting of the video bag 200 to an interior of a vehicle. The rings can be attached to straps 220, 222 having hooks or clips 224. Each strap 220, 222 can be wrapped around an interior of a vehicle, such as around the top of a headrest 330 of a seat 350, around the bottom of a seat 350, or around any object fixed to the interior of the vehicle, such as a seat track. In the configuration shown in FIG. 11, both displays 130, 135 are detached from the video player housing 100 and the video bag 200 is mounted between the seats 350 of the vehicle. Alternatively, the video bag 200 may also be mounted on an individual seat 350, for example on the seat's rear side.

The displays 130, 135 are individually mounted behind the front section of the vehicle by respective display mounts. The display mounts include a bag 400, which houses the display 130, 135 and attaches to straps 420 for strapping onto a seat 350. The straps 420 include an adjusting mechanism 425 to adjust for different sizes of a seat 350. The bag 400 includes openings 440, 442 for facilitating access to the connectors of the display and for viewing a video on the screen of the display 130. A carry bag (not shown) can be used to house the video bag 200, the video player housing 100, the displays 130, 135, display mounts, and other accessories. The carry bag has a zippered top to close the bag for transporting the mobile video system.

Figure 12A:
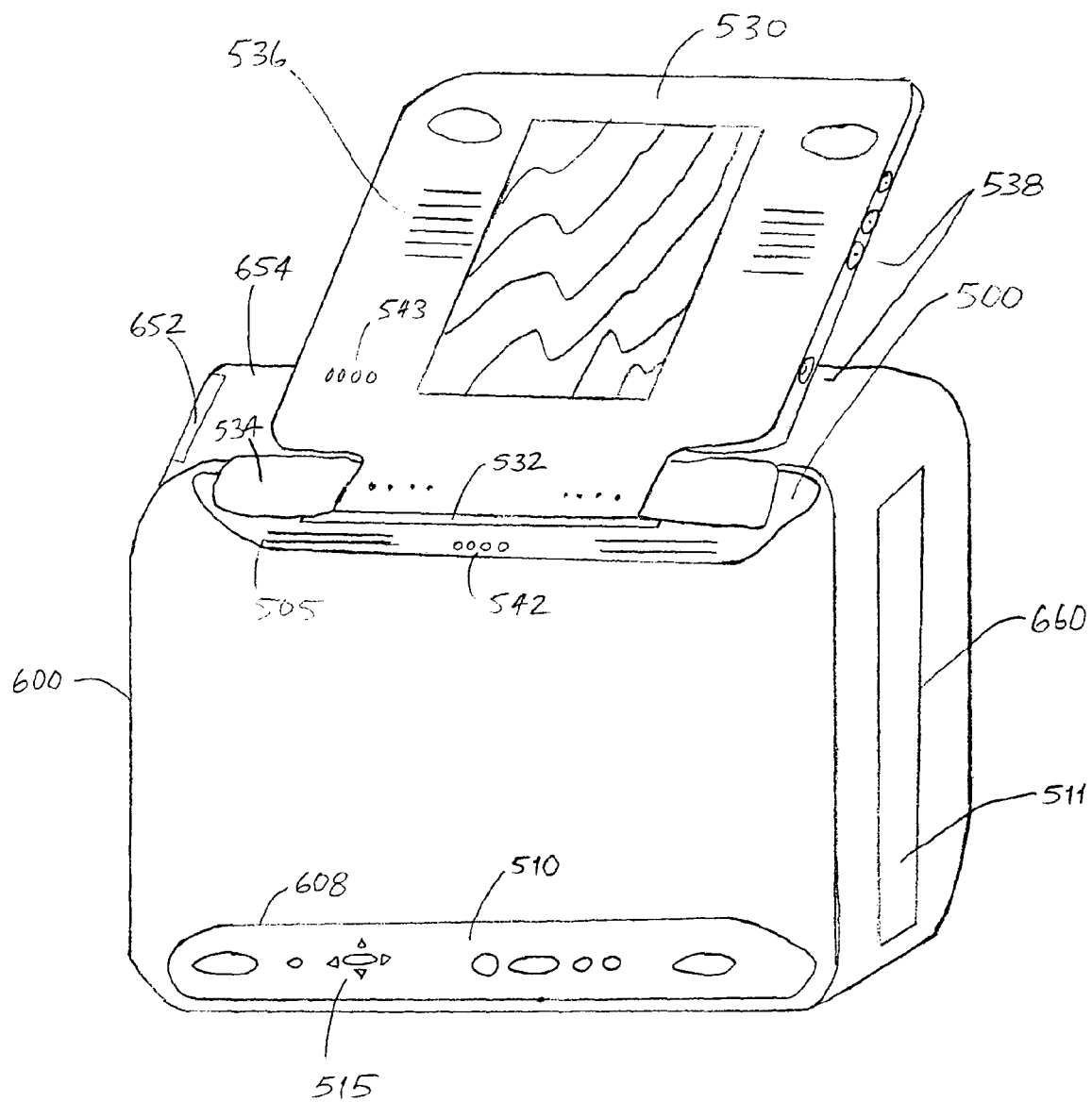
FIG. 12A shows a video player housing in a video bag according to another embodiment of the present invention.

FIG. 12A shows a video player housing 500 and a video bag 600 according to another embodiment of the present invention. The video player housing 500 preferably includes a DVD player and is housed within video bag 600. Video bag 600 is made to snugly fit the video player housing 500 and includes an opening 608 for facilitating access to control panel 510 and an opening (not shown) to allow access to interface connectors along a side of the video player (not shown). An opening 660 allows access to a disk drawer or slot 511 of the DVD player for insertion or removal of a video disk. The video bag 600 may have more or less openings depending on the configuration of panels, connectors and controls on the housing 500. Like the previously described embodiments, the DVD player may be a clamshell, slot or drawer type DVD player.

A flap 654 can be opened for placing the video player housing 500 into the bag 600 and closed by a close mechanism 652, which can be Velcro or a zipper. When the flap 654 is closed, all controls and interfaces positioned on the video player housing 500 can be accessed without opening any panel of the video bag 600.

Figure 13:
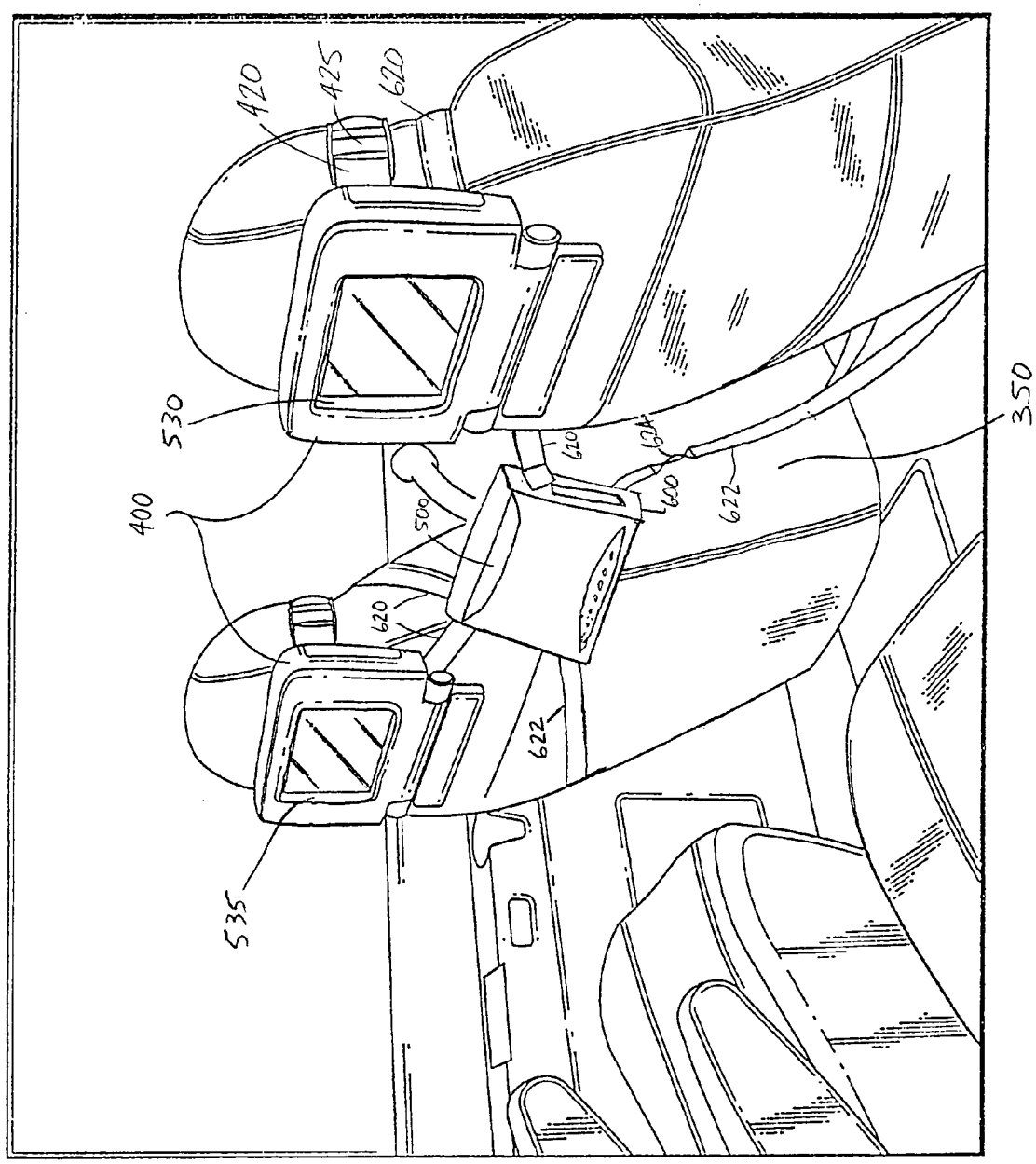
FIG. 13 shows the video player housing and video bag of FIG. 12A mounted within an interior of a vehicle.

As shown in FIG. 13, video bag 600 includes a plurality of mounting rings (e.g., ring 612) for receiving straps 620, 622 and/or clips 624 for mounting the video player housing 500 and the bag 600 within an interior of a vehicle. Display 530 has characteristics similar to display 130 described above for the above embodiment including capability to attach and detach from the video player housing 500 through a connector 532 and hinge arrangement 534 as previously described. A second display or monitor can be connected to the video player housing 500 via the external connectors of the video player (not shown) or the connectors 538 of the display 530.

The display 530 may be a detachable 5.8" LCD monitor screen that can be hand held or can mount on a vehicle seat headrest in front of the viewer with a canvas mounting system like the mounting bags 400 and straps 420 described in connection with the previous embodiment. The video player housing 500 may include controls 515 such as brightness up/down, volume up/down, power on/off, DVD menu, DVD power on/off, left/right/up/down/enter and previous/play/next/stop/eject. The video player housing 500 may also include headphone output jacks, an A/V input jack, RCA AV input jacks, DVD/RCA AV output jacks, a display port input jack, a power input jack for a display, a power LED for a display, an S-video output jack, display output jacks for use with optional displays, a power input jack, a full function remote control, a cigarette lighter adapter, a display cable, and an AC/DC adapter.

The video player housing 500, the video player itself and/or the display 530 also include a wireless transmitters 542, 543 like the wireless transmitters 142, 143 described in connection with the previous embodiment for transmission of, for example, video and/or audio information to other displays and wireless headphones via IR or RF signals. In addition, like the previously described embodiment, speakers 505, 536 may be used to play the audio portion of a program.

Figure 12B:
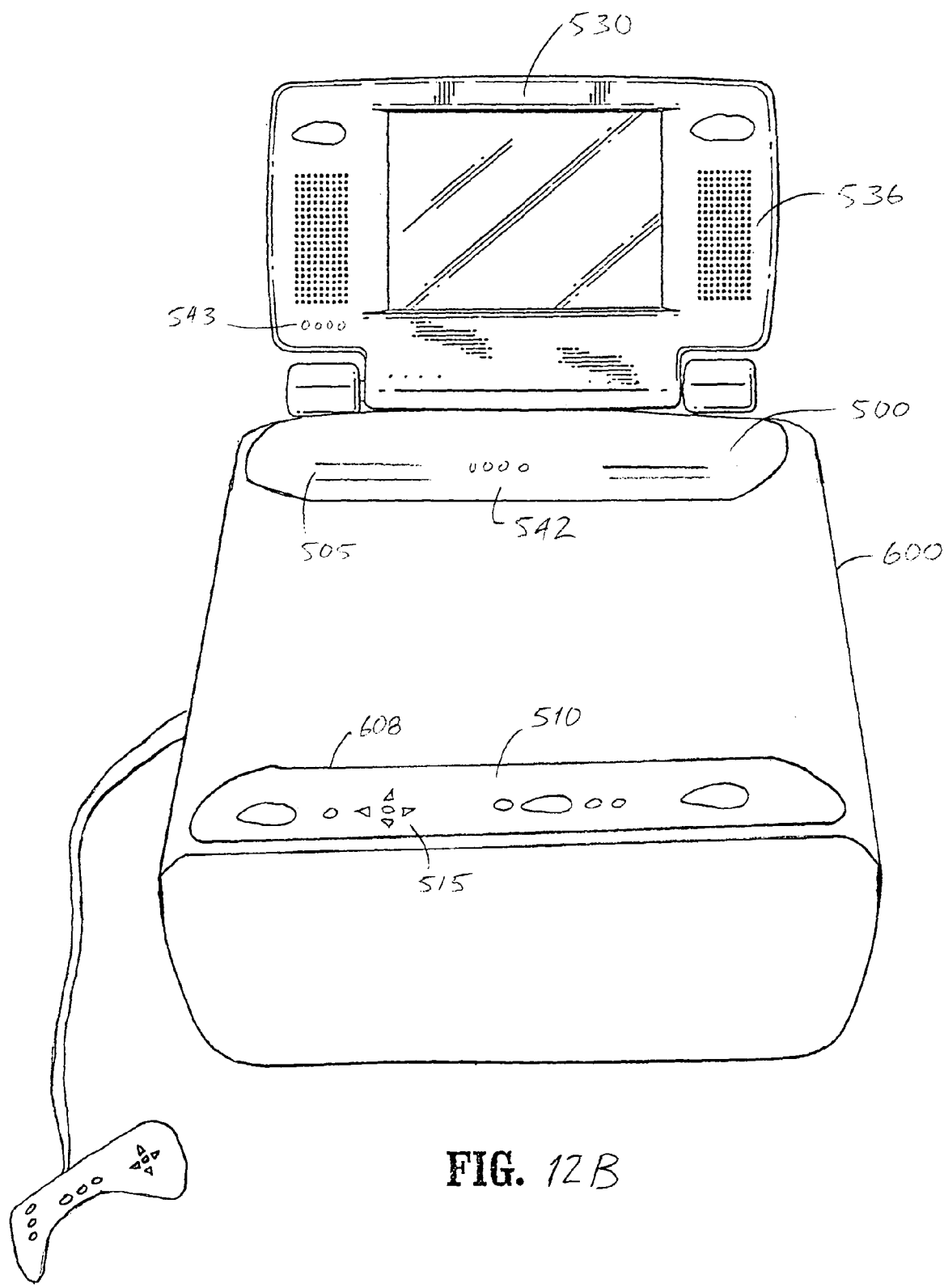
FIG. 12B shows the video player housing of FIG. 12A in an orientation outside of a vehicle.

FIG. 12B shows the video player housing 500 of FIG. 12A in a different orientation, with the control panel 510 facing upward. The video player housing 500 is placed on a desktop and configured as a game console for play of a video game. Like the display 130 shown in FIG. 9, the monitor 530 can also be pivoted on the video player housing 500 for optimum viewing angles depending on the orientation of the video player housing 500.

FIG. 13 shows the video player housing 500 housed within the video bag 600 and mounted within an interior of a vehicle. A plurality of mounting rings (e.g., ring 612) attached to the upper and lower portions of video bag 600 receives clips and/or hooks 624 connected to straps 620, 622 for mounting on or between front seats 350 of a vehicle. The display 530 and an optional display 535 can both be mounted using the monitor mounting bags 400 and straps 420 behind each seat 350 as shown in FIG. 11. In such configuration, two passengers behind each front seat 350 can each have view of a separate display 530, 535. Alternatively, the display or monitor 530 is detached from the video player housing 500 and can be handheld. A separate carry bag (not shown) can be used to house the video player housing 500, the video bag 600, the monitor(s) 530, 535 and other accessories.

In sum, a video system is provided that can be easily mounted in and transferred between different vehicles. The video system can operate with more than display remote from a media player and provide video and audio signals to wireless receivers.

Given the teachings of the present invention provided herein, one of ordinary skill in the related art will contemplate these and various other configurations, interactions, and mounting arrangements between the elements of a display device according to the present invention, while maintaining the spirit and scope thereof.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A video system comprising:
    at least one media player;
    at least one display, wherein the at least one display is capable of receiving a first video signal and a first audio signal corresponding to a first program from the at least one media player;
    an assembly housing for supporting the at least one media player and the at least one display; and
    a wireless transmitter on the at least one display for wirelessly transmitting at least one of the first video signal or the first audio signal, wherein the at least one display is capable of being mounted to the assembly housing at a mounting location in a first orientation and is removable to be remounted at the mounting location in a second orientation reversed from the first orientation.

2. The video system of claim 1, wherein the wireless transmitter wirelessly transmits the first audio signal to at least one pair of wireless headphones.

3. The video system of claim 1, wherein:
    the at least one display receives a second video signal and a second audio signal corresponding to a second program from one of the at least one media player or at least one other media player; and the wireless transmitter wirelessly transmits at least one of the second video signal or the second audio signal on a different channel and at a different frequency from the first video signal and the first audio signal.

4. The video system of claim 3, wherein the wireless transmitter simultaneously transmits the first and second video signals and the first and second audio signals.

5. The video system of claim 3, wherein the at least one display includes a multiplexer for selecting one of the first or second programs for display.

6. The video system of claim 1, wherein the wireless transmitter is capable of simultaneously transmitting each of a plurality of wireless signals on a different channel and at a different frequency.

7. The video system of claim 1, wherein the wireless transmitter is capable of wirelessly transmitting signals using at least one of infrared or radio frequency.

8. The video system of claim 1, further comprising at least one other wireless transmitter on one of the at least one media player or the assembly housing and capable of transmitting at least one of the first video signal or the first audio signal to at least one of wireless headphones, the at least one display or at least one other display.

9. The video system of claim 1, wherein the at least one display is operatively coupled to the at least one media player and is capable of receiving one of the first video signal or the first audio signal via one of a physical connection or a wireless receiver.

10. The video system of claim 1, wherein the at least one media player is one of a videocassette player, a digital video disk player, a television tuner or a video game player.

11. The video system of claim 1, wherein the at least one media player is one of a clamshell type, slot type or a drawer type digital video disk player.

12. The video system of claim 1, wherein the at least one media player includes a door that pivots for allowing insertion of a media storage medium into the at least one media player.

13. The video system of claim 1, further comprising a bag for mounting the assembly housing, including the at least one media player and the at least one display, one of on one seat or between two seats in a vehicle.

14. The video system of claim 13, wherein the bag includes at least one opening for providing access to one of controls or at least one interface panel of the at least one media player without removing the assembly housing from the bag.

15. The video system of claim 13, wherein the bag includes a plurality of openings for providing access to controls and to at least one interface panel of the at least one media player without removing the assembly housing from the bag.

16. The video system of claim 13, wherein the bag includes at least one opening for providing access to a media storage medium insertion point on the at least one media player without removing the assembly housing from the bag.

17. The video system of claim 1, further comprising a bag for mounting the at least one display to a seat in a vehicle when the at least one display is remote from the assembly housing.

18. The video system of claim 17, wherein the bag includes at least one opening for providing access to an interface panel of the at least one display without removing the at least one display from the bag.

19. The video system of claim 17, wherein the bag includes at least one opening for providing a view of a screen of the at least one display without removing the at least one display from the bag.

20. The video system of claim 1, wherein a screen of the at least one display faces a first side of the assembly housing in the first orientation and faces a second side of the assembly housing opposite the first side in the second orientation, the first and second orientations corresponding to respective first and second orientations of the assembly housing.

21. The video system of claim 1, wherein the at least one display is capable of being pivoted on the assembly housing to a plurality of positions.

22. The video system of claim 1, wherein the wireless transmitter wirelessly transmits at least one of the first video signal or the first audio signal to at least one other display.

23. A video system comprising:
at least one media player;
at least one display, wherein the at least one display is capable of receiving a first video signal and a first audio signal corresponding to a first program from the at least one media player;
an assembly housing for supporting the at least one media player and the at least one display, wherein the at least one display is capable of being mounted to the assembly housing at a mounting location in a first orientation and is removable to be remounted at the mounting location in a second orientation reversed from the first orientation; and
a first bag for mounting the assembly housing one of on one seat or between two seats in a vehicle, wherein the first bag includes an opening for providing access to a media storage medium loading point of the at least one media player without removing the assembly housing from the first bag.

24. The video system of claim 23, wherein the first bag includes another opening for providing access to at least one interface panel.

25. The video system of claim 23, further comprising a second bag for mounting the at least one display to a seat in a vehicle when the at least one display is remote from the assembly housing.

26. The video system of claim 25, wherein the second bag includes at least one opening for providing access to at least one interface panel of the at least one display without removing the at least one display from the second bag.

27. The video system of claim 25, wherein the second bag includes at least one opening for providing a view of a screen of the at least one display without removing the at least one display from the second bag.

28. The video system of claim 25, wherein the second bag is mounted to a rear of the vehicle seat using at least one strap wrapped around the vehicle seat.

29. The video system of claim 23, further comprising at least one wireless transmitter on one of the at least one media player or the assembly housing capable of transmitting at least one of the first video signal or the first audio signal to wireless headphones, the at least one display and at least one other display.

30. The video system of claim 23, wherein the at least one media player is one of a videocassette player, a digital video disk player, a television tuner or a video game player.

31. The video system of claim 23, wherein the at least one media player is one of a clamshell type, slot type or a drawer type digital video disk player.

32. The video system of claim 23, wherein the at least one media player includes a door that pivots for allowing insertion of the media storage medium into the at least one media player.

33. The video system of claim 23, wherein a screen of the at least one display faces a front side of the assembly housing in the first orientation and faces a rear side of the assembly housing in the second orientation.

34. The video system of claim 23, wherein the at least one display is capable of being pivoted on the assembly housing to a plurality of positions.

35. The video system of claim 23, further comprising a wireless transmitter on the at least one display capable of wirelessly transmitting at least one of the first video signal or the first audio signal.

36. The video system of claim 35, wherein:
the at least one display is capable of receiving one of a second video signal or a second audio signal corresponding to a second program from one of the at least one media player or at least one other media player; and
the wireless transmitter is capable of wirelessly transmitting the second video signal and the second audio signal on a different channel and at a different frequency from the first video signal and the first audio signal.

37. The video system of claim 35, wherein the wireless transmitter is capable of simultaneously transmitting each of a plurality of wireless signals on a different channel and at a different frequency.

38. A video system mounted to a seat in a vehicle comprising:
a first media player and a second media player;
at least one display operatively coupled to the first and second media players; and
an assembly housing for supporting the first and second media players and the at least one display, wherein the first media player is accessed via a first panel of the assembly housing, the second media player is accessed via a second panel of the assembly housing adjacent the first panel, and the at least one display is mountable to the assembly housing at a location between the first and second panels.

39. The video system of claim 38, wherein the first media player is one of a videocassette player, a digital video disk player, a television tuner or a video game player.

40. The video system of claim 38, wherein the second media player is one of a videocassette player, a digital video disk player, a television tuner or a video game player.

41. The video system of claim 38, wherein the first media player plays media having a different video format than media played by the second media player.

42. The video system of claim 38, wherein the at least one display is capable of receiving video signals and audio signals from the first media player and the second media player.

43. The video system of claim 42, wherein the at least one display receives the video and audio signals via one of a wired connection or a wireless connection.

44. The video system of claim 38, wherein the first and second media players are capable of wireless transmission of at least one of video or audio signals.

45. The video system of claim 38, wherein the first and second media players are capable of wired transmission of at least one of video or audio signals.

46. The video system of claim 38, wherein the at least one display includes jacks for connecting to the first and second media players, at least one other display and headphones.

47. The video system of claim 38, wherein the assembly housing includes jacks for connecting the first and second media players to the at least one display, at least one other display and headphones.

48. The video system of claim 38, wherein the at least one display is capable of displaying a program from one of the first or second media players while the at least one display is one of supported by or remote from the assembly housing.

49. The video system of claim 38, further comprising at least one other display capable of receiving video signals and audio signals from one of the first media player or the second media player.

50. The video system of claim 38, further comprising a bag for mounting the assembly housing to the seat, wherein the bag includes first and second openings for providing access to the first and second panels, respectively, without removing the assembly housing from the bag.

51. A portable video system comprising:
a first media player and a second media player;
at least one display, wherein the at least one display is capable of receiving first and second video signals from the first and second media players, respectively; and
an assembly housing for supporting the first and second media players and the at least one display, wherein the first media player is accessed via a first panel of the assembly housing, the second media player is accessed via a second panel of the assembly housing adjacent the first panel, and the at least one display is mountable to the assembly housing at a location between the first and second panels.

52. A video system comprising:
at least one media player;
at least one display, wherein the at least one display is capable of receiving a first video signal and a first audio signal corresponding to a first program from the at least one media player; and
an assembly housing for supporting the at least one media player and the at least one display, wherein the at least one display is capable of being mounted to the assembly housing at a mounting location in a first orientation and is removable to be remounted at the mounting location in a second orientation reversed from the first orientation.

53. The video system of claim 52, wherein a screen of the at least one display faces a front side of the assembly housing in the first orientation and faces a rear side of the assembly housing in the second orientation.

* * * * *

UNITED STATES PATENT AND TRADEMARK OFFICE
CERTIFICATE OF CORRECTION

PATENT NO.       : 7,050,124 B2
APPLICATION NO.  : 10/658313
DATED            : May 23, 2006
INVENTOR(S)      : George C. Schedivy It is certified that error appears in the above-identified patent and that said Letters Patent is hereby corrected as shown below:

Title Page Item [73]

Change the Assignee to read from:

"Samsung Electronics Co., Ltd."

to

-- Audiovox Corporation --

Signed and Sealed this

Twentieth Day of February, 2007

JON W. DUDAS
*Director of the United States Patent and Trademark Office*